United States Patent Office 3,020,705
Patented Feb. 13, 1962

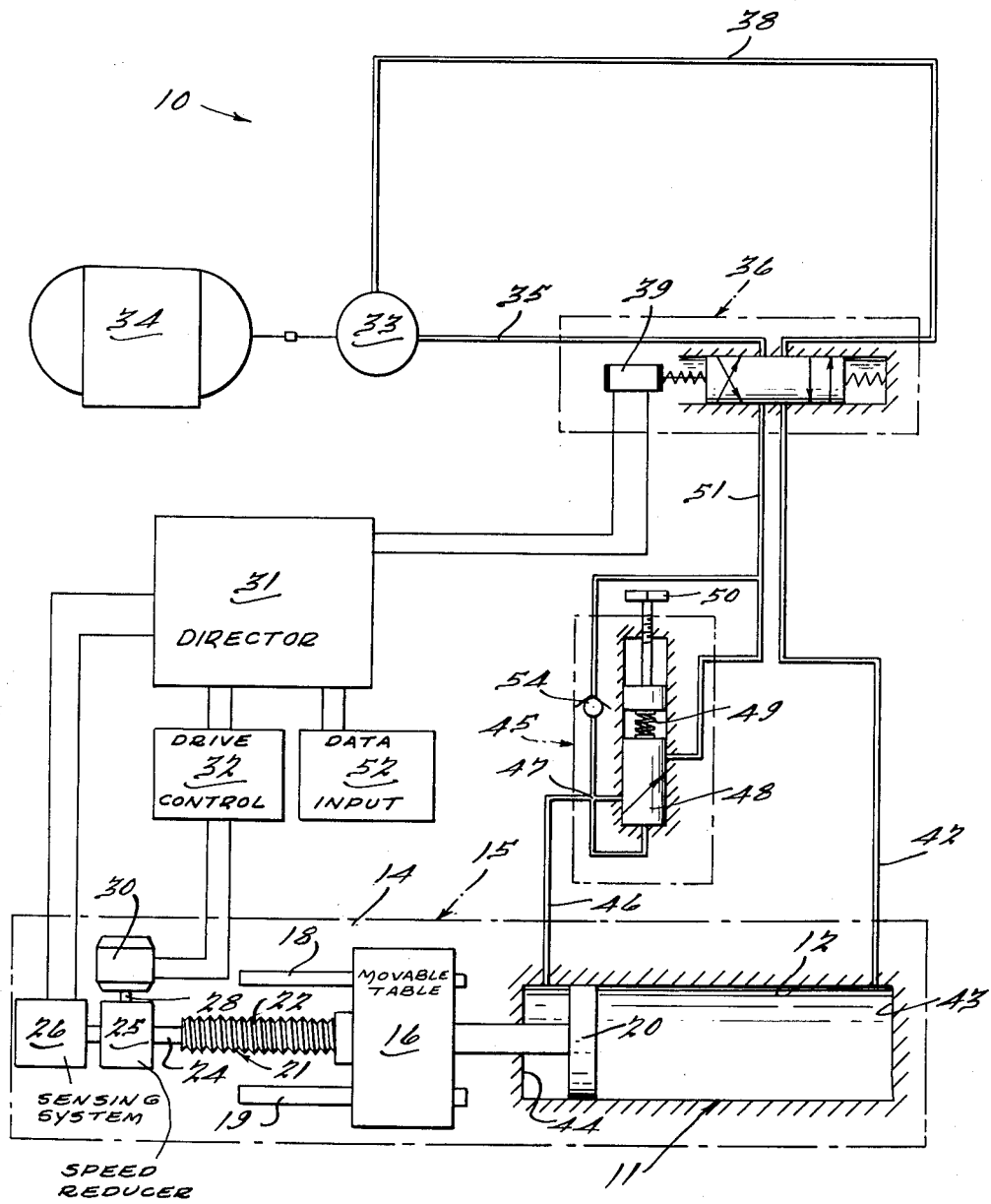

3,020,705
POSITIONING SYSTEM INCLUDING A PRIME MOVER AND LOCKING MEANS THEREFOR
Walter P. Hill, Detroit, Mich., assignor to Walter P. Hill, Inc., Detroit, Mich., a corporation of Michigan
Filed Oct. 21, 1959, Ser. No. 847,807
14 Claims. (Cl. 60—6)

This invention relates to an improved numerical positioning control system.

The function of a numerical positioning control system is to translate digital intelligence relating to a decimal coordinate dimension into an analog characteristic usable to position a movable device, for example, a movable component of a machine tool. Such a numerical positioning control system is applicable to any machine having a movable component that is positionable at a numerically definable point on a fixed component thereof. For example, a numerical positioning control system is well suited for the control of a drilling machine having a movable table for the support of a workpiece when it is required that holes be drilled at successive positions on the workpiece, each of which is capable of being numerically defined on a coordinate of movement of the table.

The basic components of such a numerical positioning control system, each of which is readily available commercially, are an intelligence input device, a director, a position sensing system, a drive control, and a prime mover for the movable component of the machine.

Coordinate intelligence representing a desired position for the movable component can be translated from a digital characteristic by, for example, manually set decade switches, a card reader or a tape reader.

Manually set decade switches are the simplest means of introducing decimal dimensions into a numerical positioning control system. Ordinarily, one switch is provided for each digit in the position dimension, a separate set of switches being provided for each coordinate of movement.

Coordinate intelligence entered in digital form on a standard business machine card can be translated into a suitable analog characteristic by a card reader. Usually, one card is employed for each machine position and each machine operation.

Punched paper tape may also be used to introduce dimensional intelligence into a numerical positioning control system. The punched holes contain digital dimensions in a simple coded form that, as the tape passes through a tape reader, are translated into an electrical input to a director.

The director of a numerical positioning control system receives the intelligence, in the form of electrical signals, from the intelligence input device, and converts this information into a command voltage to a position sensing unit, for example, a conventional selsyn system. This voltage represents a numerically defined position that a movable component of, for example, a machine tool is to occupy with respect to a fixed component of the machine.

Whenever the movable component of the machine tool is in a position other than the position defined by the command voltage, an error voltage is transmitted from the position sensing device to the director which analyzes the error signal and energizes a drive control for the prime mover in accordance therewith. The input signal into the drive control has a sense, indicating the direction of error, and in some systems, an amplitude proportional to displacement of the movable component from the correct position.

The capacity of the prime mover required to position the movable component of a machine tool depends primarily upon the load on the movable component. However, in numerical positioning control systems presently known and used, the output of the drive control is used to energize the prime mover for the movable component. Therefore, the ouput capacity of the prime mover is determined by the output capacity of the drive control. Characteristically, a drive control having a large power output is relatively expensive. Alternatively, a less expensive drive control has a relatively small output which smaller capacity dictates the use of a relatively small prime mover. Thus a direct relationship exists, in numerical positioning control systems presently known and used, between the output of the drive control and the capacity of the prime mover, and therefore between the cost of the system and the capacity of the system.

As an example of the foregoing, on relatively lightly loaded machine tools it is customary to use a servo drive control comprising an electronic rectifier to energize a prime mover in the form of a small D.-C. motor. The electronic rectifier generally comprises a pair of half-wave thyratron rectifiers arranged in a back-to-back circuit that is capable of supplying power to a prime mover rated at ¾ H.P. and below. Such a drive control unit is relatively inexpensive and easy to maintain.

However, when it is required that the prime mover have a large power output, as, for example, when the movable component of a machine tool is relatively heavily loaded, it is necessary to use a servo drive employing an amplidyne-generator to supply the necessary power to the prime mover. Such an amplidyne-generator drive control is both complicated and costly.

Alternatively, a prime mover comprising a hydraulic cylinder or motor can be used for large loads. Control of such cylinders or motors is achieved through an electrically actuated hydraulic servo valve. Hydraulic fluid under pressure is metered to a hydraulic cylinder by the servo valve. The error signal from the director is an input to a valve excitation amplifier that energizes a solenoid to open the servo valve in proportion to the amplitude of the signal, thereby permitting fluid to flow at a rate proportional to the error signal. The amount of servo valve opening is controlled by the error signal, thereby regulating the speed of movement of the machine. As the desired position is reached, the flow, and thus the rate of movement, slows down to a speed proportional to position error and stops when the error is reduced to zero. Such hydraulic servo valves are characteristically relatively complex and difficult to maintain.

Each of the aforementioned numerical positioning control systems is basically similar in that the output of the drive control is used to energize a prime mover for the movable component of the machine. Therefore, the output of the prime mover is directly related to and limited by the power output of the drive control.

The present invention encompasses an entirely new concept of numerical positioning control. It is basically different than the aforementioned systems in that control is effected over the output of a prime mover rather than controlling the input thereto. The basic components discussed hereinbefore are the same and have the same output characteristic. However, the output characteristic effects control of the system in a new and novel manner.

Broadly, control is exercised over the net energy output of the prime mover rather than controlling the input of energy thereto. Therefore, a prime mover of theoretically infinite capacity can be controlled by the smallest of known drive controls by adjusting the net output of the prime mover. A novel relationship between the aforementioned control system components and a balancing system having a predeterminable net or effective energy output permits positive control of such a relatively large prime mover.

Accordingly, one object of the present invention is a new and novel numerically positioning control system.

Another object is to control a prime mover of theoretically infinite capacity by a numerical positioning control system having a relatively small output capacity.

Another object is to provide a numerical positioning system wherein the positioning control functions to permit movement of a prime mover rather than to effect such movement.

Other objects and advantages of the present invention will become apparent from a study of the following specification wherein reference is made to the drawing in which the single FIGURE is a diagrammatic view of an exemplary embodiment of a positioning control system.

Referring to the drawing, a numerical positioning control system 10, in accordance with an exemplary embodiment of the present invention, comprises a prime mover 11, for example a hydraulic cylinder 12 that is rigidly attached to a fixed component 14 of, for example, a machine tool 15. A movable component or table 16, of the machine tool 15, is provided for the support of a workpiece (not shown) and is supported for movement along a single coordinate as by a pair of fixed parallel ways 18 and 19 on the fixed component 14. The table 16 is secured to a piston 20 that is operatively related with the cylinder 12. The piston 20 and table 16 are movable along a single coordinate under the bias of fluid in the cylinder 12.

A lead screw 21 having a threaded portion 22 is threadably coupled to the table 16 of the machine tool 15 in the conventional manner. The threaded engagement between the lead screw 21 and the table 16 maintains a fixed relationship between the axial position of the table 16 and the rotational position of the lead screw 21.

The lead screw 21 is mechanically connected to a low speed shaft 24 of a conventional speed reducer 25. The low speed shaft 24 of the speed reducer 25 is also mechanically connected to a sensing system 26, for example a conventional selsyn system, that gives positive indication of the rotational position of the lead screw 21, and therefore the coordinate position of the table 16. Such a selsyn system 26, as well as the other aforementioned basic components, are obtainable from, for example, the General Electric Company.

A high speed shaft 28 of the speed reducer 25 is mechanically connected to a relatively small D.-C. motor 30, for example a D.-C. motor rated at ¾ H.P.

The motor 30 and selsyn system 26 are electrically connected by suitable conductors to a conventional director 31 and drive control 32, for example an electronic drive control of minimum output capacity, sold by the General Electric Company under the trade name Thymotrol.

Hydraulic pressure to operate the prime mover 11 is obtained from a hydraulic pump 33 that is driven as by an electric motor 34. Hydraulic fluid is conducted from the pump 33 through a fluid conduit 35 to a normally closed control valve 36, for example a Vickers control valve Catalog No. DG554 that provides for directional control of oil flow upon energization of a solenoid 39 thereof. A fluid return conduit 38 is provided between the valve 36 and pump 33. The control valve 36 is actuated to the forward or reverse positions as by a solenoid 39, that is energized by the director 31, as will be described.

A fluid conduit 42 is connected to the control valve 36 and to one end 43 of the cylinder 12. The other end 44 of the cylinder 12 is connected to a conventional hydraulic counterbalance valve 45, for example a Vickers counterbalance valve Catalog No. RCT, as by a conduit 46 the valve 45 maintaining a back pressure in the cylinder 12 to counteract hydraulically sustained loads. The counterbalance valve 45 maintains a back pressure in the end 44 of the cylinder 12 to maintain a predetermined pressure differential on opposite sides of the piston 20. Fluid flow through the valve 45 is normally blocked until the pressure at an inlet 47 and effective on the lower end of a piston 48 overcomes the bias of a valve spring 49 thereon. The bias of the valve spring 49 on the piston 48 is adjustable as by a screw 50. Upon the occurrence of the aforementioned predetermined pressure the piston 48 is biased upwardly, permitting fluid flow through the balancing valve 45, thus maintaining the predetermined pressure differential on opposite sides of the piston 20. Fluid is returned to the control valve 36 through a conduit 51. It is to be noted that by adjusting the pressure differential on opposite sides of the piston 20, which is accomplished by varying the bias of the spring 49 on the piston 48 in the valve 45, the net axial force on the screw 21 can be varied. The net axial force on the screw 21 is the total force exerted by the piston 20 on the table 16, less that required to move the load comprising the table 16 and a workpiece (not shown). Obviously, the valve 45 requires adjustment for different loads. Adjustment of the valve 45 permits the axial force on the screw 21 to be varied from a zero net force condition, which is undesirable because it obviates the inherent back lash take-up characteristic of the system, to a force limited only by the pressure capabilities of the hydraulic system. The most desirable net axial force on the screw 21 is the maximum force that the mechanical system is capable of balancing due to frictional losses therein. When this condition obtains, no output torque is required of the motor 30 to maintain the system static and an infinitely small output torque is theoretically required of the motor 30 to unlock the mechanical system to initiate movement of the table 16 to a new position.

Thus, the hydraulic system can be adjusted to maintain a continuous bias on the table 16. Movement of the table 16 is restricted to a single coordinate as by the ways 18 and 19, and therefore the continuous axial force applied to the screw 21 results in a torque applied thereto. Because of the relatively large mechanical advantage of the screw with respect to the table 16, the resultant torque on the screw 21 is relatively small. This torque is further reduced by the mechanical advantage of the input shaft 28 over the output shaft 24 of the speed reducer 25. In practice, the mechanical advantage afforded by the screw 21 and speed reducer 25, over the net axial force on the screw 21, in conjunction with frictional forces in the mechanical system is sufficient to balance the axial force of the table 16 in the screw 21 with negligible resultant torque on the shaft 28 of the speed reducer 25.

Upon insertion of digital coordinate intelligence into a data input device 52, an analog characteristic, representative of a coordinate position, is transmitted therefrom to the director 31. The director 31 compares the coordinate characteristic with a position characteristic received from a sensing system, for example the selsyn system 26. The director 31 resolves the aforementioned characteristics into a resultant characteristic, for example a D.C. voltage having a particular polarity. This voltage is transmitted to both the drive control 32, which energizes the electric motor 30, and to the operating solenoid 39 of the hydraulic control valve 36. Upon energization by the drive control 32, the electric motor 30 rotates in the appropriate direction and in effect unlocks the lead screw to permit repositioning of the table 16 due to the force applied thereto by the unbalanced fluid system through the piston 20. Because the control valve 36 and motor 30 are energized simultaneously, the aforementioned pressure differential on opposite sides of the piston 20 is maintained. However, because the balancing force on the fluid system is relieved due to rotation of the motor, which in effect unlocks the mechanical system, the pressure differential is permitted to bias the table 16 to a new position relative to the fixed component 14 of the machine tool 15.

Each increment of movement of the table 16 is reflected by a corresponding rotational increment of the lead screw and therefore by a new position characteristic from the selsyn system 26. When the position characteristic transmitted by the selsyn system 26 to the director unit 31 matches the input characteristic from the intelligence input unit 52 the director 31 de-energizes the drive control 32 and solenoid 39 of the control valve 36. This, in effect, locks the mechanical system, preventing further movement of the table 16 under the bias of the unbalanced fluid system.

Reversal of the direction of movement of the table 16, in the embodiment of the invention illustrated, is facilitated by a check valve 54 that, in conjunction with an output voltage of suitable polarity from the director 31 and drive control 32 for energizing the motor 30 and solenoid 39, respectively, in the reverse direction, permits reversal of the system 10. It is obvious that an additional counterbalance valve 45 can be added to the system 10, if desired, to control movement in both directions.

Thus, by using the output of the drive control 32 to unlock a mechanical system, thereby to control the net output of the prime mover 11, positive control of a theoretically infinitely large prime mover 11 is obtained by the relatively small drive control 32. Therefore, the limiting relationship between the output of the drive control and the capacity of the prime mover, as found in numerical positioning control systems heretofore known and used, is eliminated.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A numerical positioning control system comprising a fixed component, a movable component movable relative to said fixed component, means for biasing said movable component, means for holding said movable component against movement relative to said fixed component under the bias of said biasing means, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for comparing the output characteristics of said position intelligence unit and said coordinate intelligence unit having an output characteristic, means responsive to said comparing means output characteristic for releasing said holding means to permit movement of said component under the bias of said biasing means when said movable component is in a position other than the position required by said coordinate intelligence characteristic, and second means responsive to said comparing means output characteristic for controlling said biasing means to effect movement of said movable component.

2. A numerical positioning control system comprising a fixed component, a movable component movable relative to said fixed component, means for biasing said movable component including a prime mover, mechanical means for holding said movable component against movement relative to said fixed component under the bias of said prime mover, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for comparing the output characteristics of said position intelligence unit and said coordinate intelligence unit having an output characteristic with a sense indicative of a required direction of movement for the movable component to bring it to said desired position, means responsive to said comparing means characteristic for releasing said holding means to permit movement of said movable component under the bias of said prime mover when said movable component is in a position other than the position required by said coordinate intelligence characteristic, and means operable in accordance with the sense of said comparing means output characteristic for controlling said prime mover to effect movement of said movable component.

3. A numerical positioning control system comprising a fixed component, a movable component movable relative to said fixed component, means for biasing said movable component including a hydraulic prime mover, means for holding said movable component against movement relative to said fixed component under the bias of said prime mover, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for comparing the output characteristics of said position intelligence unit and said coordinate intelligence unit having an output characteristic, and means responsive to said comparing means characteristic for releasing said holding means to permit movement of said movable component under the bias of said prime mover when said movable component is in a position other than the position required by said coordinate intelligence characteristic, and second means responsive to said comparing means output characteristic for controlling said biasing means to effect movement of said movable component.

4. A numerical positioning control system comprising a fixed component, a movable component movable relative to said fixed component, means for biasing said movable component including a hydraulic prime mover, mechanical means for holding said movable component against movement relative to said fixed component under the bias of said prime mover, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for resolving the output characteristics of said position intelligence unit and said coordinate intelligence unit into an output characteristic, and means responsive to said resolving means characteristic for releasing said holding means to permit movement of said movable component under the bias of said prime mover when said component is in a position other than the position required by said coordinate intelligence characteristic, and second means responsive to said resolving means characteristic for controlling said biasing means to effect movement of said movable component under the bias of said biasing means.

5. A numerical positioning control system comprising a fixed component, a movable component movable relative to said fixed component, means for exerting a continuous bias on said movable component comprising a hydraulic prime mover, a source of hydraulic pressure, and a balancing valve, means for holding said movable component against movement relative to said fixed component under the bias of said prime mover, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for comparing the output characteristics of said position intelligence unit and said coordinate intelligence unit having an output characteristic, and means responsive to said comparing means characteristic for releasing said holding means to permit movement of said movable component under the bias of said prime mover when said movable component is in a position other than the position required by said coordinate intelligence characteristic, and second means responsive to said comparing means output characteristic for controlling said biasing means to effect movement of said movable component.

6. A numerical positioning control system comprising a fixed component, a movable component movable with respect to said fixed component, means for exerting a continuous bias on said movable component comprising a hydraulic prime mover, a source of hydraulic pressure, a balancing valve, a control valve, said balancing and control valves being in fluid flow relationship in series with said prime mover and source for effecting movement of said movable component, means for holding said movable component against movement relative to said fixed component under the bias of said prime mover, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for comparing the output characteristics of said position intelligence unit and said coordinate intelligence unit and having an output characteristic for energizing said control valve, means responsive to said comparing means characteristic for releasing said holding means to permit movement of said movable component under the bias of said prime mover when said movable component is in a position other than the position indicated by said coordinate intelligence characteristic.

7. A numerical positioning control system comprising a fixed component, a movable component movable with respect to said fixed component, means for biasing said movable component including a prime mover, means for holding said movable component against movement relative to said fixed component under the bias of said prime mover comprising a mechanical system having an output member coupled to said movable component and an input member having a large mechanical advantage over said output member, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for comparing the output characteristics of said position intelligence unit and said coordinate intelligence unit having an output characteristic, means coupled to said input member responsive to said comparing means characteristic for releasing said movable component for movement, and second means responsive to said comparing means output characteristic for controlling said biasing means to effect movement of said movable component.

8. A numerical positioning control system comprising a fixed component, a movable component movable with respect to said fixed component, means for biasing said movable component including a prime mover, means for holding said movable component against movement relative to said fixed component under the bias of said prime mover comprising a mechanical system having an output member coupled to said movable component and an input coupled to an electric motor, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for comparing the output characteristics of said position intelligence unit and said coordinate intelligence unit having an output characteristic, means responsive to said comparing means characteristic for energizing said electric motor to release said holding means to permit movement of said movable component under the bias of said prime mover when said movable component is in a position other than the position indicated by said coordinate intelligence characteristic, and second means responsive to said comparing means output characteristic for controlling said biasing means to effect movement of said movable component.

9. A numerical positioning control system comprising a fixed component, a movable component movable with respect to said fixed component, a prime mover for biasing said movable component, means for holding said movable component against movement relative to said fixed component under the bias of said prime mover including a lead screw threadably engaged with said movable component, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for comparing the output characteristics of said position intelligence unit and said coordinate intelligence unit having an output characteristic, means responsive to said comparing means characteristic for releasing said lead screw for rotation to permit movement of said movable component under the bias of said prime mover when said movable component is in a position other than the position indicated by said coordinate intelligence characteristic, and means operable upon the occurrence of and in accordance with the output characteristic of said comparing means for energizing said prime mover to move said movable component.

10. A numerical positioning control system comprising a fixed component, a movable component movable with respect to said fixed component, means for biasing said movable component, means for holding said movable component against movement with respect to said fixed component under said bias comprising a lead screw threadably coupled to said movable component, a speed reducer having a low speed shaft coupled to said lead screw and a high speed shaft coupled to an electric motor, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for comparing the output characteristic of said position intelligence unit with the output characteristic of said coordinate intelligence unit having an output characteristic, means responsive to said comparing means characteristic for energizing said electric motor to permit movement of said movable component under the bias of said biasing means when said movable component is in a position other than the position indicated by said coordinate intelligence characteristic, and second means responsive to said comparing means output characteristic for controlling said biasing means to effect movement of said movable component.

11. A numerical positioning control system comprising a fixed component, a movable component movable with respect to said fixed component, a source of hydraulic pressure, a hydraulic prime mover having a balancing valve for maintaining a continuous bias on said movable component, means for holding said movable component against movement relative to said fixed component under the bias of said prime mover comprising a lead screw threadably coupled to said movable component, and a speed reducer having a low speed output shaft coupled to said lead screw and a high speed input shaft coupled to an electric motor, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, and means for comparing the output characteristic of said position intelligence unit with the output characteristic of said coordinate intelligence unit having an output characteristic of appropriate sense for energizing said electric motor for rotation in a direction to permit movement of said movable component to the position indicated by said coordinate intelligence unit, and means operable in accordance with the sense of said comparing means output characteristic for controlling said prime mover to effect movement of said movable component.

12. A numerical positioning control system comprising a fixed component, a movable component movable with respect to said movable component, means for maintaining a continuous bias on said movable component comprising a hydraulic circuit including a prime mover, a source of hydraulic pressure, a control valve, and a balancing valve connected in fluid circuit, means for holding said movable component against movement relative to said fixed component under the bias of said prime mover comprising a lead screw threadably coupled to said movable component, a speed reducer having a low speed output shaft coupled to said lead screw and a high speed input shaft coupled to an electric motor, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for comparing the output characteristics of said position intelligence unit and said coordinate intelligence unit having a resultant output, and means responsive to said comparing means output for energizing said electric motor to permit movement of said movable component under the bias of said prime mover when said movable component is in a position other than the position indicated by said coordinate intelligence characteristic, and second means responsive to said comparing means output characteristic for controlling said biasing means to effect movement of said movable component.

13. A numerical positioning control system comprising a fixed component, a movable component movable with respect to said fixed component, means for maintaining a continuous bias on said movable component comprising a hydraulic prime mover, a source of hydraulic pressure, a control valve, and an adjustable balancing valve in fluid flow connected relationship, means for holding said movable component against movement relative to said fixed component under the bias of said prime mover comprising a lead screw threadably coupled to said movable component, a speed reducer having a low speed output shaft coupled to said lead screw and a high speed input shaft coupled to an electric motor, means for releasing said holding means comprising a position intelligence unit having an output characteristic indicative of the position of said movable component with respect to said fixed component, a coordinate intelligence unit having an output characteristic indicative of a desired position for said movable component with respect to said fixed component, means for comparing the output characteristics of said position intelligence unit and said coordinate intelligence unit having a resultant output, and means responsive to said comparing means output for energizing said electric motor to permit movement of said movable component under the bias of said prime mover when said movable component is in a position other than the position indicated by said movable coordinate intelligence characteristic, and second means responsive to said comparing means output characteristic for controlling said biasing means to effect movement of said movable component.

14. A numerical positioning control system comprising a fixed component, a movable component movable with respect to said fixed component, means for biasing said movable component including a hydraulic cylinder having a piston connected to said movable component, means for holding said movable component against movement relative to said fixed component under the bias of said piston comprising a lead screw threadably coupled to said movable component, a speed reducer having a low speed output shaft coupled to said lead screw and a high speed input shaft coupled to an electric motor, means for releasing said holding means comprising a drive control, a position intelligence unit having an output characteristic indicative of the position of said movable component with respect to said fixed component, a coordinate intelligence unit having an output characteristic indicative of a desired position for said movable component with respect to said fixed component and means for comparing the output characteristics of said position intelligence unit and said coordinate intelligence unit having a resultant output characteristic for energizing said drive control for said electric motor thereby to permit movement of said movable component under the bias of said biasing means when said movable component is in a position other than the position indicated by said coordinate intelligence characteristic, and second means responsive to said comparing means output characteristic for controlling said biasing means to effect movement of said movable component.

References Cited in the file of this patent

UNITED STATES PATENTS

| | | |
|---|---|---|
| 2,477,108 | Young | July 26, 1949 |
| 2,563,295 | Westbury | Aug. 7, 1951 |
| 2,821,172 | Randall | Jan. 28, 1958 |
| 2,886,008 | Geyer et al. | May 12, 1959 |
| 2,949,742 | Williamson et al. | Aug. 23, 1960 |
| 2,968,144 | Royle et al. | Jan. 17, 1961 |